UNITED STATES PATENT OFFICE.

WILLIAM H. ALLEN, OF DETROIT, MICHIGAN.

PROCESS OF PRESERVING FOOD SUBSTANCES.

1,098,006. Specification of Letters Patent. Patented May 26, 1914.

No Drawing. Application filed August 11, 1913. Serial No. 784,093.

*To all whom it may concern:*

Be it known that I, WILLIAM H. ALLEN, a citizen of the United States, and a resident of Detroit, in the county of Wayne and State of Michigan, have invented a new and Improved Process of Preserving Food Substances, of which the following is a specification.

This invention relates to the process of preserving food substances, such as fruit pulps and juices, vegetable pulps and juices, finely divided vegetable substances, and grated meats, but more particularly tomato pulp and apple pulp; and its object is the introduction of a harmless antiseptic material into the food substances which can be so completely altered that no trace of the original antiseptic material will remain in the food substance and no injurious product will result from such change of the antiseptic material.

This process is restricted to the preservation of such foods as are not affected in a merchantable way by the addition of common salt.

Tomato catsup is usually made by distintegrating the fruit to eliminate the skins and seeds. The pulp is then heated to kill the germs of putrefaction and fermentation, after which the pulp, while still hot, is placed in barrels or other containers. Such sterilization is very often ineffective for the reason that the spores of some germs remain alive and when conditions become favorable, develop and re-infect the entire mass, resulting in complete loss of the contents of the container. Such attempts at sterilization are made at country stations where the crops are raised and where the work must necessarily be performed by workmen of limited skill.

The present process consists in adding to the fruit, vegetable or meat pulp an amount of arsenic-free hydrochloric acid equaling about four-tenths of one per cent. of the material to be treated, which amount is about twice the quantity of hydrochloric acid present in the gastric juice in the human stomach, but this proportion may vary from one per cent. to one-tenth of one per cent., depending upon the material treated. This proportion of hydrochloric acid will inhibit all growths in the material to be preserved and render it practically sterile, and keep it sterile for a long period of time. When the preserved material is to be further treated for the preparation of marketable food products, a sufficient amount of arsenic-free sodium bicarbonate or sodium carbonate is added to completely neutralize the acid.

$$HCl + NaHCO_3 = NaCl + H_2O + CO_2.$$

The material then has only a slight admixture of common salt, the result of the above reaction, the added water being negligible and the carbon dioxid passing off freely. The material can then be concentrated or mixed with more salt, or with vinegar, spices or other condiments.

The acid could be neutralized by any other alkaline substance, such as calcium carbonate or potassium carbonate, but this is not desirable as the resultant compounds are objectionable.

I claim:

1. The addition of a sufficient amount of hydrochloric acid to a vegetable pulp to render the same sterile, and the further addition of a carbonate of sodium to neutralize the acid when the pulp is to be further prepared, thereby changing all the hydrochloric acid and sufficient sodium salt to neutralize the acid into common salt.

2. The addition of a sufficient amount of hydrochloric acid to a tomato pulp to render the same sterile and the further addition of sufficient sodium carbonates to neutralize the acid when the pulp is to be further prepared, thereby changing the hydrochloric acid and the carbonates into common salt.

3. The addition of a sufficient amount of hydrochloric acid to a food pulp to render the same sterile, and the further addition of a carbonate of sodium to neutralize the acid when the pulp is to be further prepared, thereby changing all the hydrochloric acid and so much of the sodium salt as is necessary to neutralize the acid into common salt.

In testimony whereof I have signed this specification in the presence of two subscribing witnesses.

WILLIAM H. ALLEN.

Witnesses:
 WM. J. LONGSTAFF,
 HUGO W. KREINBRING.